US012619834B2

(12) United States Patent
Mehrotra et al.

(10) Patent No.: US 12,619,834 B2
(45) Date of Patent: May 5, 2026

(54) SYSTEMS AND METHODS FOR INTENT CLASSIFICATION IN A NATURAL LANGUAGE PROCESSING AGENT

(71) Applicant: Salesforce, Inc., San Francisco, CA (US)

(72) Inventors: Shubham Mehrotra, Santa Clara, CA (US); Zachary Alexander, Berkeley, CA (US); Shilpa Bhagavath, Mountain View, CA (US); Gurkirat Singh, Elk Grove, CA (US); Shashank Harinath, Mountain View, CA (US); Anuprit Kale, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 308 days.

(21) Appl. No.: 18/161,767

(22) Filed: Jan. 30, 2023

(65) Prior Publication Data

US 2024/0143945 A1 May 2, 2024

Related U.S. Application Data

(60) Provisional application No. 63/381,271, filed on Oct. 27, 2022.

(51) Int. Cl.
| | |
|---|---|
| *G06F 40/47* | (2020.01) |
| *G06F 40/20* | (2020.01) |
| *G06F 40/30* | (2020.01) |
| *G06F 40/35* | (2020.01) |
| *G06F 40/51* | (2020.01) |
| *G06N 20/00* | (2019.01) |

(52) U.S. Cl.
CPC .............. *G06F 40/47* (2020.01); *G06F 40/20* (2020.01); *G06F 40/30* (2020.01); *G06F 40/35* (2020.01); *G06F 40/51* (2020.01); *G06N 20/00* (2019.01)

(58) Field of Classification Search
CPC .......... G06F 40/30; G06F 40/35; G06F 40/20; G06N 20/00
See application file for complete search history.

(56) References Cited

U.S. PATENT DOCUMENTS

| | | | |
|---|---|---|---|
| 2019/0280992 A1* | 9/2019 | Arzumanyan | ..... G06Q 20/3255 |
| 2020/0050667 A1* | 2/2020 | Lin | ......................... G06F 16/35 |
| 2020/0065384 A1* | 2/2020 | Costello | ................... G06N 3/04 |

(Continued)

OTHER PUBLICATIONS

Zhang et al., "Discriminative nearest neighbor few-shot intent detection by transferring natural language inference." arXiv preprint arXiv:2010.13009 (Year: 2020).*

(Continued)

*Primary Examiner* — Samuel G Neway
(74) *Attorney, Agent, or Firm* — Haynes and Boone, LLP

(57) ABSTRACT

Embodiments described herein provide a cross-lingual intent classification model that predicts in multiple languages without the need of training data in all the multiple languages. For example, data requirement for training can be reduced to just one utterance per intent label. Specifically, when an utterance is fed to the intent classification model, the model checks whether the utterance is similar to any of the example utterances provided for each intent. If any such utterance(s) are found, the model returns the specified intent, otherwise, it returns out of domain (OOD).

17 Claims, 11 Drawing Sheets

(56) References Cited

U.S. PATENT DOCUMENTS

| | | | |
|---|---|---|---|
| 2020/0097496 A1* | 3/2020 | Alexander | G06F 16/355 |
| 2021/0303798 A1* | 9/2021 | Duong | H04L 51/02 |
| 2021/0406463 A1* | 12/2021 | Bhutungru | G06F 40/263 |
| 2022/0171938 A1* | 6/2022 | Jalaluddin | G06F 40/30 |
| 2022/0208177 A1* | 6/2022 | Chandra | G06N 3/088 |
| 2022/0284049 A1* | 9/2022 | Christensen | G06F 16/3323 |
| 2023/0086302 A1* | 3/2023 | Bhagavath | G10L 15/22 |
| | | | 704/9 |
| 2024/0078264 A1* | 3/2024 | Solis | G06N 3/045 |
| 2024/0126795 A1* | 4/2024 | Zhong | H04L 51/02 |
| 2024/0143945 A1* | 5/2024 | Mehrotra | G06F 40/51 |

OTHER PUBLICATIONS

Tarakci et al., "Comparison of classification performance of kNN and WKNN algorithms." Journal homepage: http://sujes. selcuk. edu. tr/sujes 20.02 (Year: 2021).*
Zhou et al., "KNN-contrastive learning for out-of-domain intent classification." Proceedings of the 60th Annual Meeting of the Association for Computational Linguistics (vol. 1: Long Papers) (Year: 2022).*

* cited by examiner

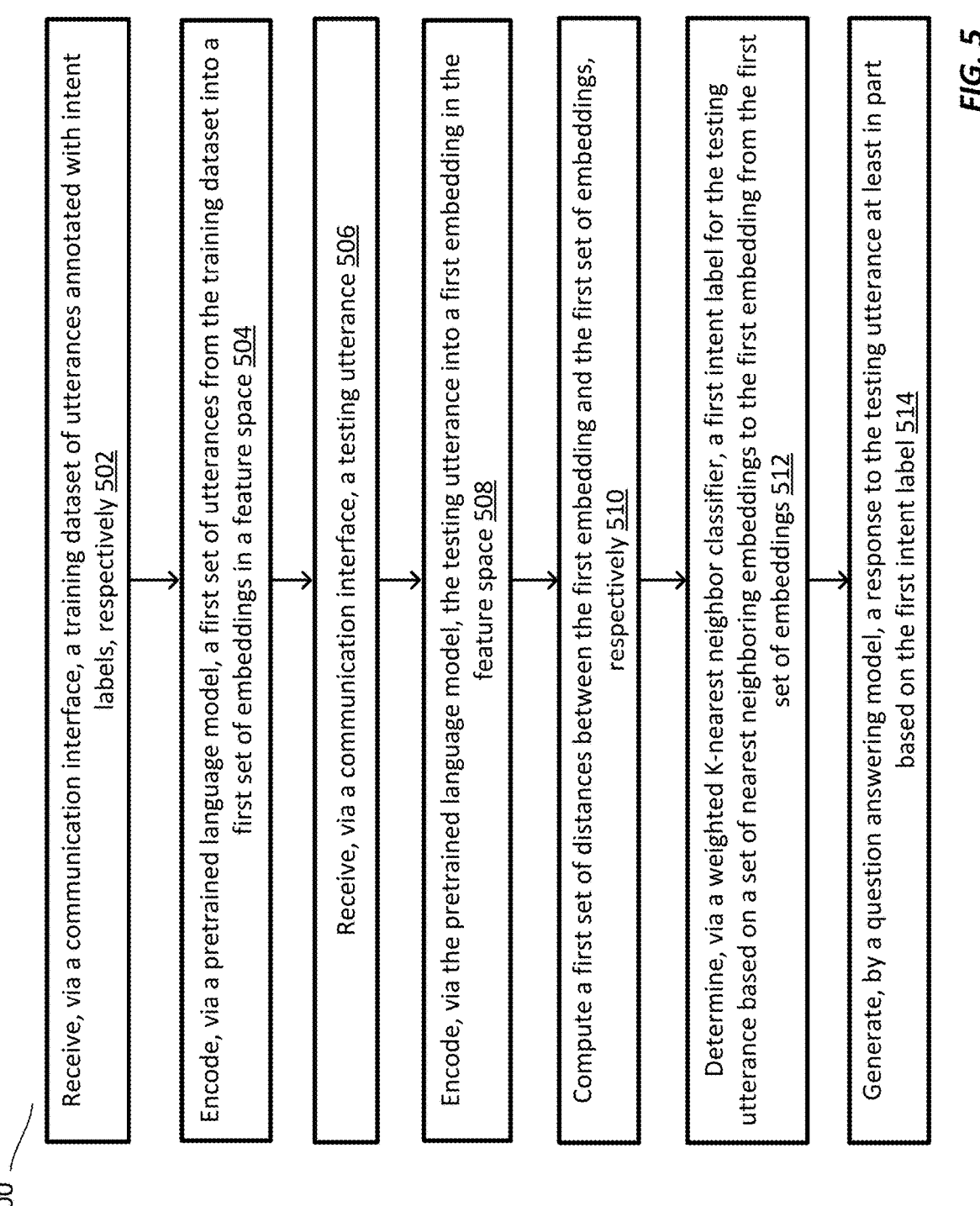

Receive, via a communication interface, a training dataset of utterances annotated with intent labels, respectively 502

Encode, via a pretrained language model, a first set of utterances from the training dataset into a first set of embeddings in a feature space 504

Receive, via a communication interface, a testing utterance 506

Encode, via the pretrained language model, the testing utterance into a first embedding in the feature space 508

Compute a first set of distances between the first embedding and the first set of embeddings, respectively 510

Determine, via a weighted K-nearest neighbor classifier, a first intent label for the testing utterance based on a set of nearest neighboring embeddings to the first embedding from the first set of embeddings 512

Generate, by a question answering model, a response to the testing utterance at least in part based on the first intent label 514

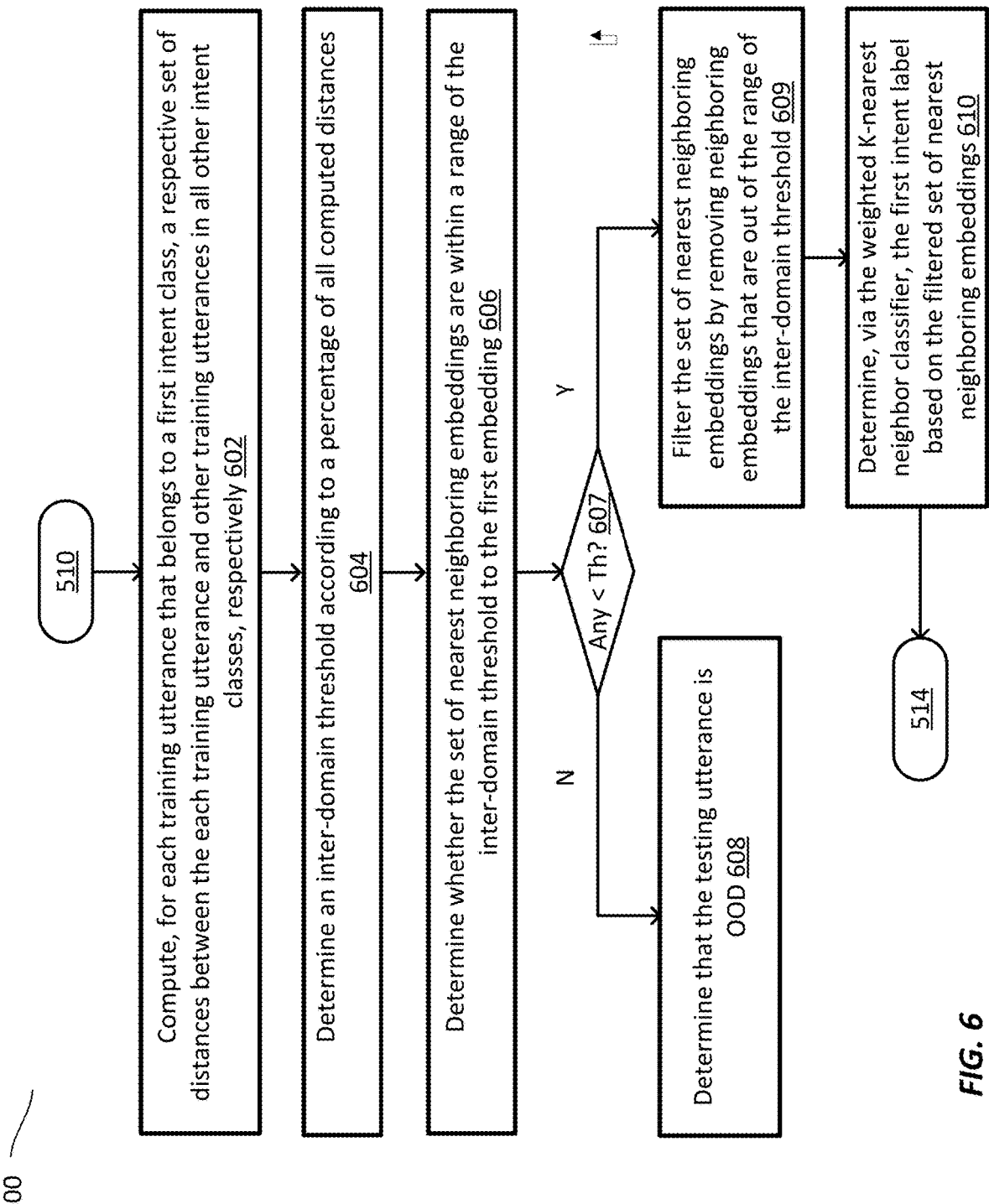

510

Compute, for each training utterance that belongs to a first intent class, a respective set of distances between the each training utterance and other training utterances in all other intent classes, respectively 602

Determine an inter-domain threshold according to a percentage of all computed distances 604

Determine whether the set of nearest neighboring embeddings are within a range of the inter-domain threshold to the first embedding 606

Any < Th? 607

N

Y

Determine that the testing utterance is OOD 608

Filter the set of nearest neighboring embeddings by removing neighboring embeddings that are out of the range of the inter-domain threshold 609

Determine, via the weighted K-nearest neighbor classifier, the first intent label based on the filtered set of nearest neighboring embeddings 610

SYSTEMS AND METHODS FOR INTENT CLASSIFICATION IN A NATURAL LANGUAGE PROCESSING AGENT

CROSS REFERENCES

The instant application is a nonprovisional of and claims priority to 35 U.S.C. 119 to U.S. provisional application No. 63/381,271, filed Oct. 27, 2022, which is hereby expressly incorporated by reference herein in its entirety.

TECHNICAL FIELD

The embodiments relate generally to natural language processing and machine learning systems, and more specifically to systems and methods for intent classification to provide natural language understanding in a conversation agent.

BACKGROUND

Machine learning systems have been widely used in automatic conversational systems such as an intelligent chatbot in customer service, online learning, and/or the like. For example, a chatbot may assist a user to navigate through different task scenarios, such as travel arrangements, event planning, banking services, and/or the like. A machine learning model is usually trained on a large conversation corpus to generate a system response when a user utterance is received. Traditionally, different machine learning models may be trained per different language, and even different domains (such as booking, healthcare, information technology support, banking customer service, and/or the like) to provide specific service to users.

Therefore, there is a need for an integrated framework that provides service in multiple languages across different domains with an efficient training scheme.

BRIEF DESCRIPTION OF THE DRAWINGS

FIG. 5 is an example logic flow diagram illustrating a method of intent classification training based on the framework shown in FIGS. 1-2B, according to some embodiments described herein.

FIG. 6 is an example logic flow diagram illustrating a method of intent classification training with OOD detection based on the framework shown in FIGS. 1-2B, according to some embodiments described herein.

Figure 1:
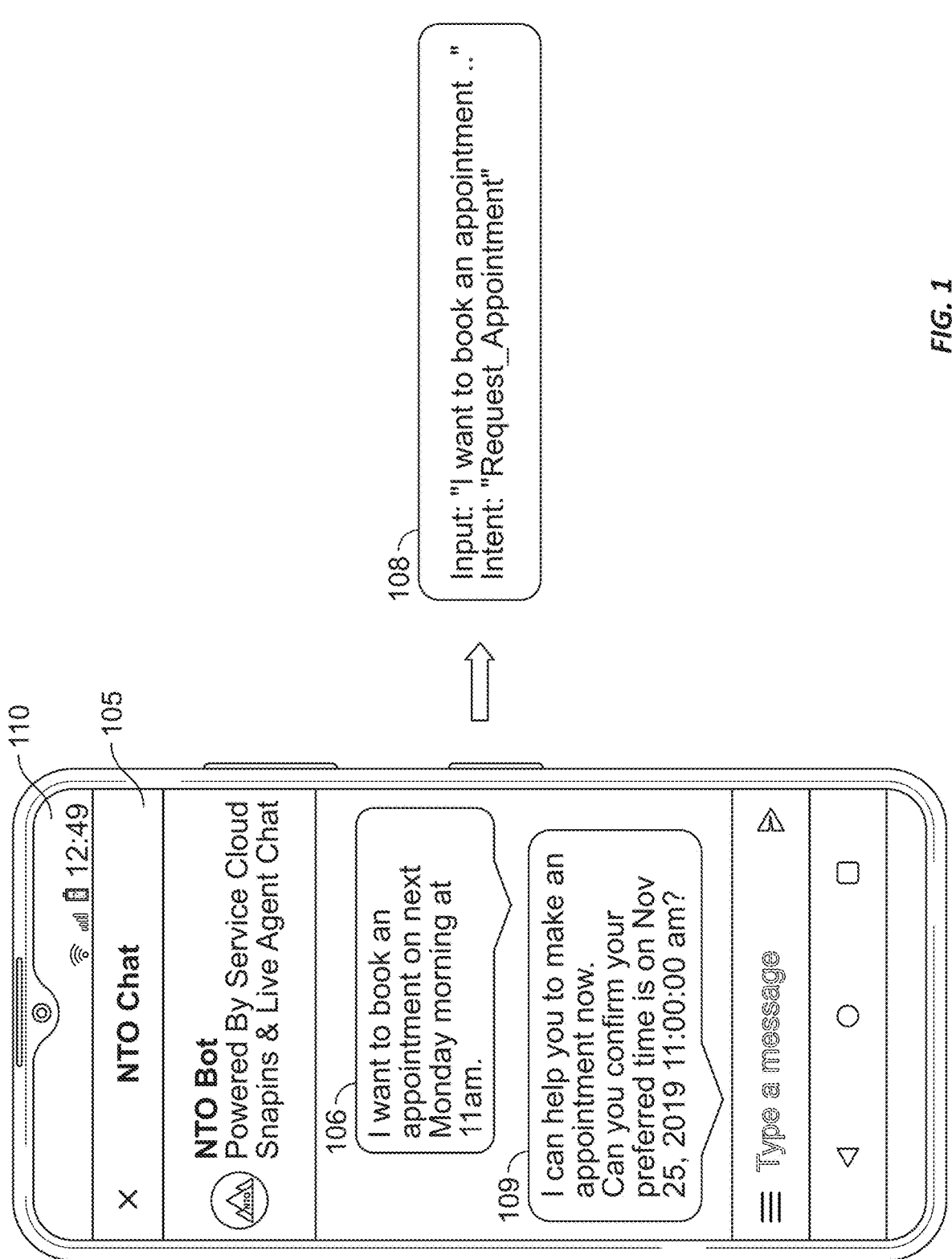
FIG. 1 is a simplified block diagram illustrating an example aspect of intent aspect with an intelligent chatbot conducting a conversation with a human user, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Machine learning systems have been widely used in automatic conversational systems such as an intelligent chatbot in customer service, online learning, and/or the like. Intent classification generates an intent label for a user utterance so as to provide natural language understanding (NLU) to enable the intelligent chatbot to redirect the conversation flow as desired based on the identified user intent.

For example, FIG. 1 is a simplified block diagram illustrating an example aspect of intent aspect with an intelligent chatbot conducting a conversation with a human user, according to embodiments described herein. As shown in FIG. 1, an intelligent service chatbot 105 may be implemented on a user device 110 (e.g., as further described with computing device 300 in FIG. 3, or user device 410 in FIG. 4) to conduct a conversation with a user. When a user says "I want to book an appointment on next Monday morning at 11 am" (e.g., 106), an intent classification model of the intelligent chatbot may classify the user intent of the user utterance 106 as "Request_Appointment" at 108. In this way, the intelligent chatbot 105 may generate a response 109 of making an appointment in response to the user utterance 106 based on the user intent "Request_Appointment."

Traditionally, an intent classification model is trained on a large corpus of conversation data in one language only. For example, one intent classification model is used to support one language, and multiple models are often required to support multiple languages for each customer. In addition, for different domains and/or tasks, such as booking, healthcare, information technology support, banking customer service, and/or the like, a question answering model is finetuned on a large corpus of conversation data on each domain. As a result, a large training dataset in different languages and different domains are often needed to train or finetune an intelligent chatbot. Due to the variety of languages and/or domains, training time and computational training overhead can be significantly increased.

In view of the need for an efficient intent classification training mechanism, embodiments described herein provide an instance-based semantic similarity model that predicts in multiple languages without the need of training data in all the multiple languages. For example, data requirement for training can be reduced to just one utterance per intent label. Specifically, when an utterance is fed to the intent classification model, the model checks whether the utterance is similar to any of the example utterances provided for each intent. If any such utterance(s) are found, the model returns the specified intent; otherwise, the model returns out of domain (OOD).

Figure 2A:
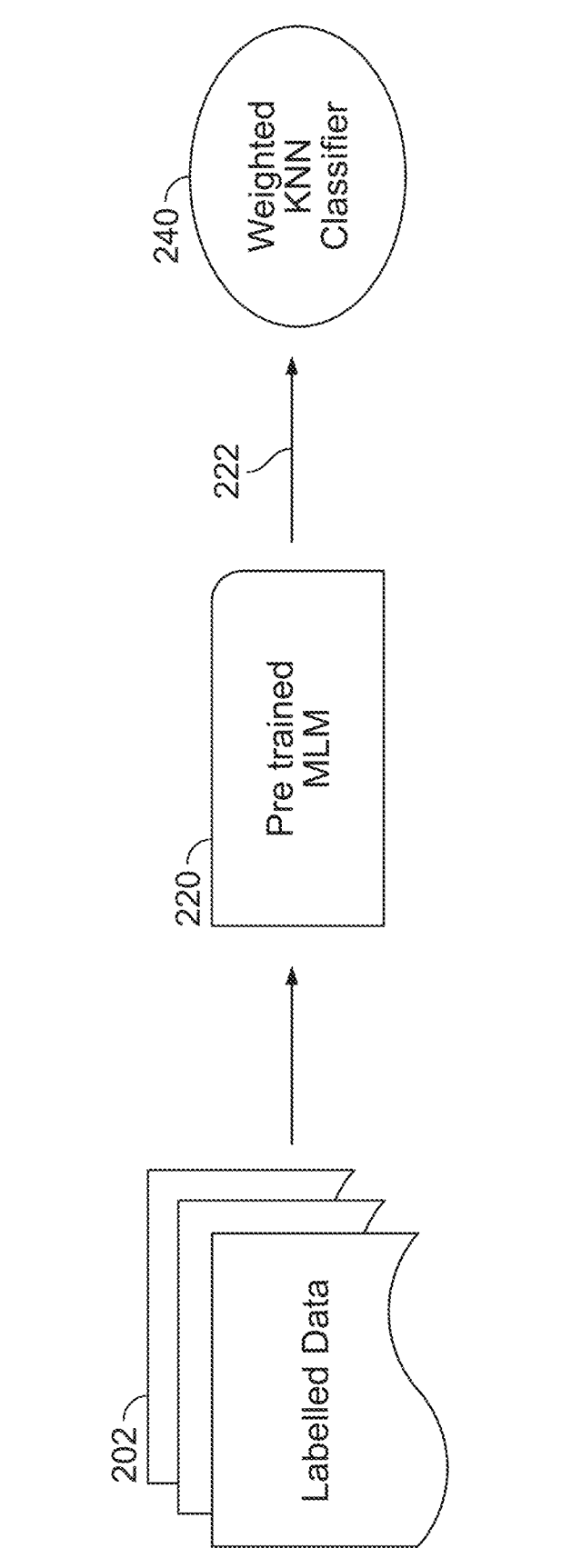
FIG. 2A shows an example structure of the intent classification framework, according to embodiments described herein.

FIG. 2A shows an example structure of the intent classification framework 200, according to embodiments described herein. The intent classification framework 200 may be built on a pre-trained multilingual language model 220 and a weighted K-nearest neighbor classifier 240. The pre-trained multilingual language model 220 may be adopted as a feature extractor, which encodes an input of labeled data into multilingual language embeddings 222. For example, the multilingual pretrained language model 220 may be a BERT model, and thus the multilingual embeddings 222 may be language-agnostic BERT sentence representations (LaBSE).

In one embodiment, the labeled data 202 may include a training dataset of sentences/utterances and their respective intent labels. The labeled data 202 may comprise utterances and/or intent labels in different languages. The multilingual pretrained language model 220 may comprise a dual encoder architecture, in which a source text (e.g., training utterances) and a target text (e.g., a testing utterance) are encoded using a shared transformer embedding network separately. Then the translation ranking task is applied, forcing texts that are paraphrased version of each other to cluster closely in the feature representation space.

For example, for all labeled training sample in the labeled data 202, the multilingual pretrained language model 220 may generate and store a LaBSE embedding associated with the intent label from the labeled data 202. In this way, given any set of labeled data 202, no additional learning of natural language understanding (NLU) is needed because the pretrained multilingual language model 220 has already been pretrained to do so. The NLU capability is offloaded to the feature extractor, i.e., the pretrained multilingual language model 220.

In one embodiment, the decoder of the intent classification framework 200 may employ a weighted K-nearest neighbor (KNN) model 240, which weigh points in the feature space by the inverse of their distance. For example, the pretrained multilingual language model 220 as the encoder may generate a LaBSE feature embedding 222 in response to an input utterance. The KNN classifier 240 may find the closest neighbors of stored LaBSE embeddings to the feature embedding 222 in the feature space. In this way, new input sentences are classified by looking for any existing training examples that are similar to the input. Thus, the number K is defined by the number of samples in the smallest intent class, resulting in K LaBSE embeddings in the feature space that belong to the particular intent class.

In one embodiment, similarity between LaBSE embeddings in the feature space can be computed as the semantic similarity between their respective utterances.

Therefore, in this way, for any customer dataset of labeled data 202, semantic similarity matching can be applied such that the model may be trained to behave according to how the customer dataset is designed. For example, a user/customer may add a few utterances for each intent and then test the resulting model with the revised training dataset, and iteratively adds/edits/deletes utterances to or from the training dataset to tweak the model's behavior in a predictable manner. The controllability of model behavior and training performance is thus largely improved. In addition, for most intent classes, a few utterances may be sufficient for the purpose of training, rendering superior performance in few-shot learning. A cross-lingual intent classification framework 200 can thus be realized with limited training utterances in multiple languages.

Figure 2B:
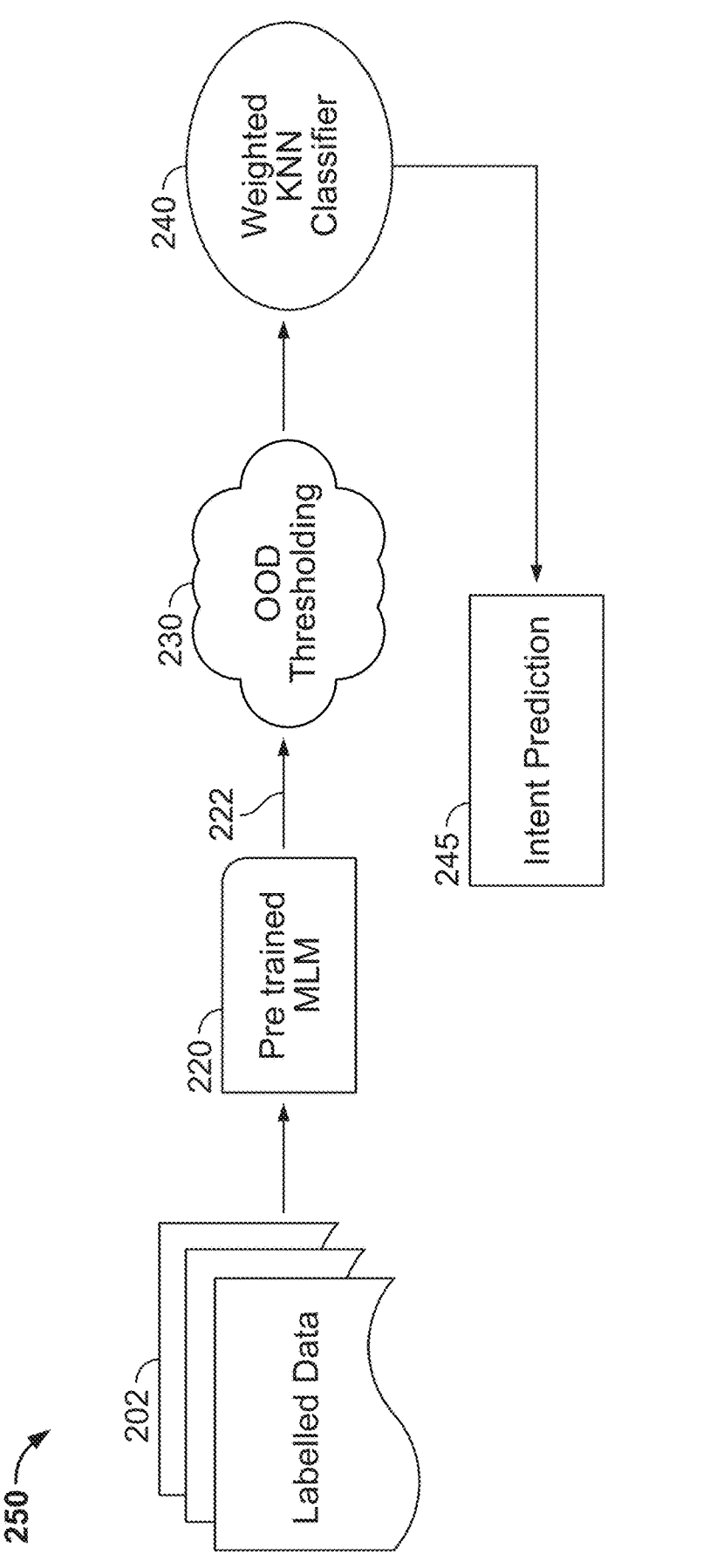
FIG. 2B shows an example structure of the intent classification framework with out-of-domain (OOD) identification, according to embodiments described herein.

FIG. 2B shows an example structure of the intent classification framework 250 with OOD identification, according to embodiments described herein. OOD detection may be triggered when a user enters a sentence that does not belong to any of the pre-defined intent classes. In one embodiment, OOD may be generalized to all unseen data.

As shown in FIG. 2A, the intent classification framework 250 similarly comprises the pretrained multilingual language model 220 as an encoder/feature extractor and a weighted KNN classifier 240 as a decoder, as the intent classification framework 200 shown in FIG. 2A. In addition, the intent classification framework 250 comprises an OOD thresholding module 230 right after the pretrained multilingual language model 220 before passing the LaBSE embeddings 222 to the weighted KNN classifier 240.

In one embodiment, the OOD threshold module 230 may be used to separate out out-of-domain utterances (e.g., utterances that may have an intent that is not previously seen or defined) from in-domain sentences (e.g., having an intent that is previously seen or defined). For example, OOD sentence may be far off from any of the intent clusters formed by training embeddings of training data samples in the feature space.

In one embodiment, the OOD threshold module 230 may use inter and intra intent cluster distances to separate OOD utterances. For example, for every sentence that is known to belong to a first intent class (from labeled data 202), the OOD threshold module 230 may compute its distance with every sentence in all other intent classes. This process can be repeated for all sentences in the training dataset, and a percentile of these computed distances is decided as if sentences that are too far off (e.g., over the percentile) may be classified as OOD, e.g., the bottom 5% (with the greatest distances) may be deemed as OOD. For example, picking a 5th percentile inter intent distance would mean that a 5% in-domain error rate is tolerated.

Therefore, the OOD thresholding module 230 may filter utterances that are deemed OOD, and send LaBSE embeddings that do not correspond to OOD utterances to the weighted KNN classifier 240 for intent classification. The weighted KNN classifier 240 may in turn generate intent classification in a similar manner as in the intent classification framework 200.

In one embodiment, combining the OOD thresholding module 230 and the weighted KNN classifier 240, intent prediction 245 may be generated as follows. For a testing LaBSE embedding encoded from a testing input, the K nearest neighbors are determined, and all neighbors that are within the percentile OOD thresholding are considered. The filtered neighbors may then be weighted by the inverse of their respective distance to the testing LaBSE embedding in the feature space. The class associated with the neighbor that has the maximum weight is thus the predicted intent class. If no neighbor is under the percentile ODD thresholding (e.g., the testing LaBSE embedding is far off other existing embeddings associated with known intent classes), the input utterance corresponding to the testing LaBSE embedding may be marked as OOD.

Computer and Network Environment

Figure 3:
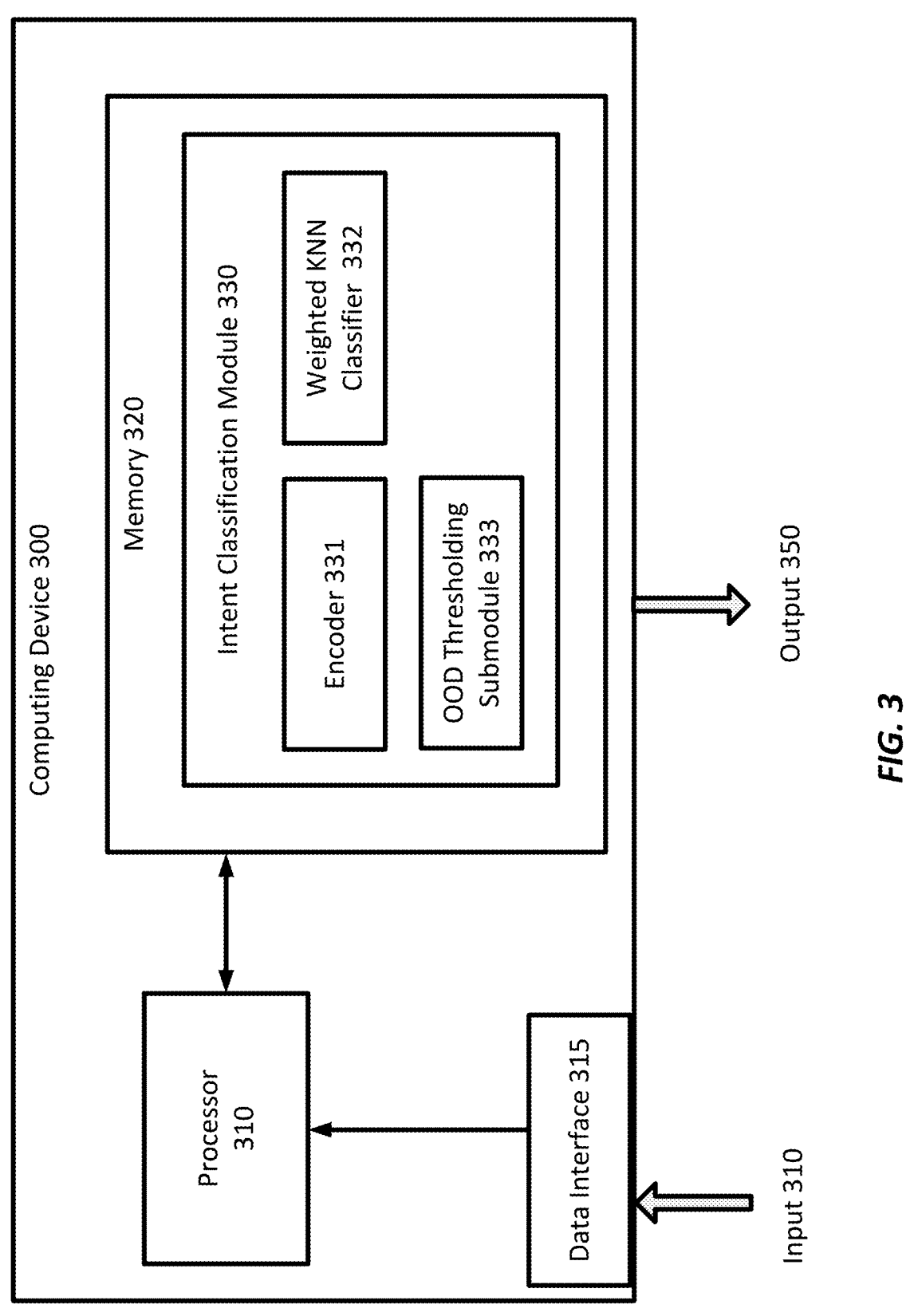
FIG. 3 is a simplified diagram illustrating a computing device implementing the intent classification framework described in FIGS. 2A-2B, according to one embodiment described herein.

FIG. 3 is a simplified diagram illustrating a computing device implementing the intent classification framework described in FIGS. 2A-2B, according to one embodiment described herein. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for intent classification module 330 that may be used to implement and/or emulate the systems and models, and/or to implement any of the methods described further herein. An intent classification module 330 may receive input 340 such as an input training data (e.g., conversation data) via the data interface 315 and generate an output 350 which may be an intent classification label.

The data interface 315 may comprise a communication interface, a user interface (such as a voice input interface, a graphical user interface, and/or the like). For example, the computing device 300 may receive the input 340 (such as a training dataset) from a networked database via a communication interface. Or the computing device 300 may receive the input 340, such as a user utterance, from a user via the user interface.

In some embodiments, the intent classification module 320 is configured to generate an intent classification label of an input sentence 310. The intent classification module 320 may further include an encoder submodule 331, a weighted KNN classifier 332 and an OOD threshold submodule 333, similar to the modules in FIGS. 2A-2B. In one embodiment, the intent classification module 330 and its submodules 331-333 may be implemented by hardware, software and/or a combination thereof.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4:
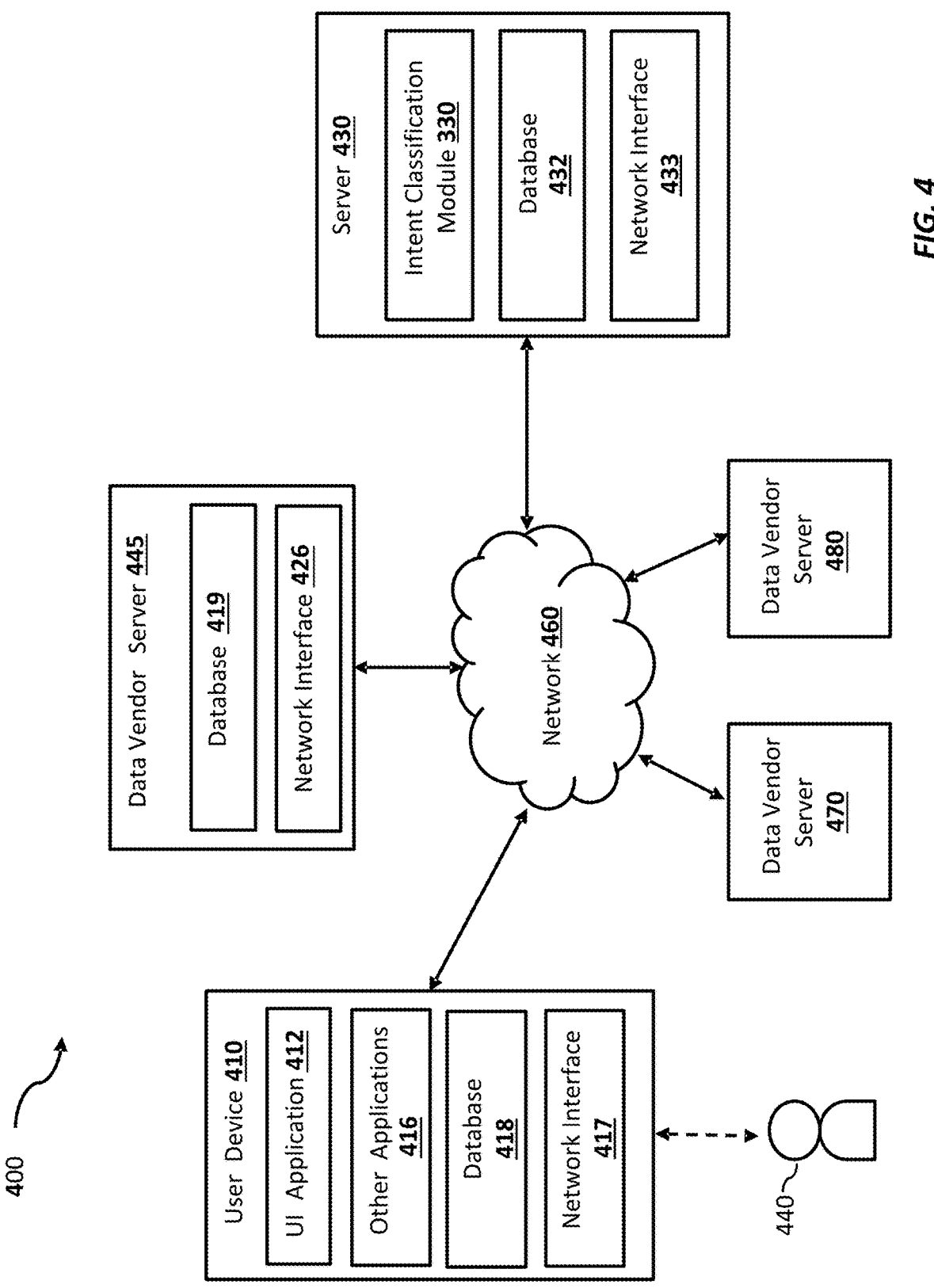
FIG. 4 is a simplified block diagram of a networked system suitable for implementing the intent classification framework described in FIGS. 2A-2B and other embodiments described herein.
Figure 7A:
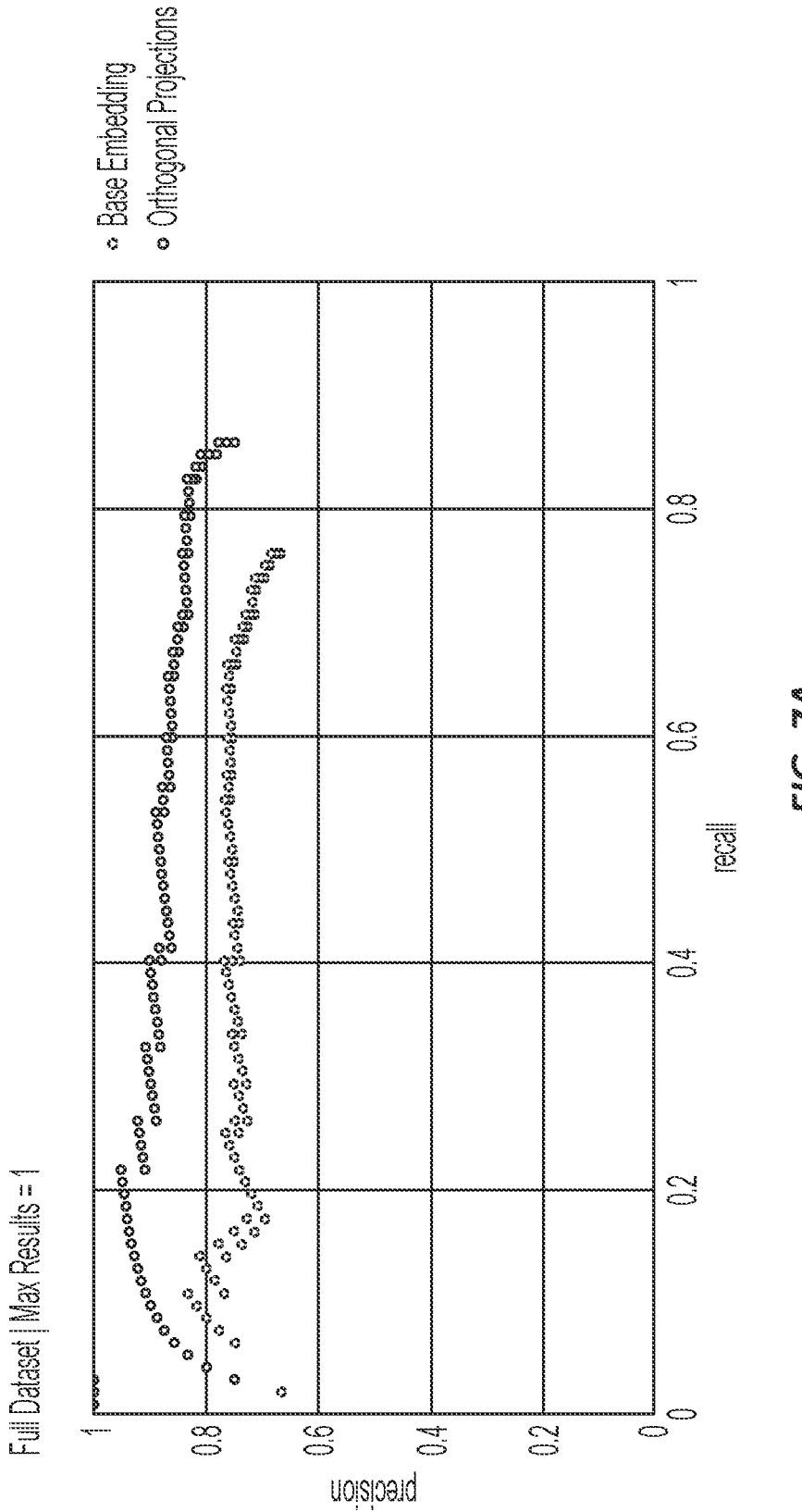
FIGS. 7A-8B provide example data plots illustrating data experiment performance, according to embodiments described herein.
Figure 7B:
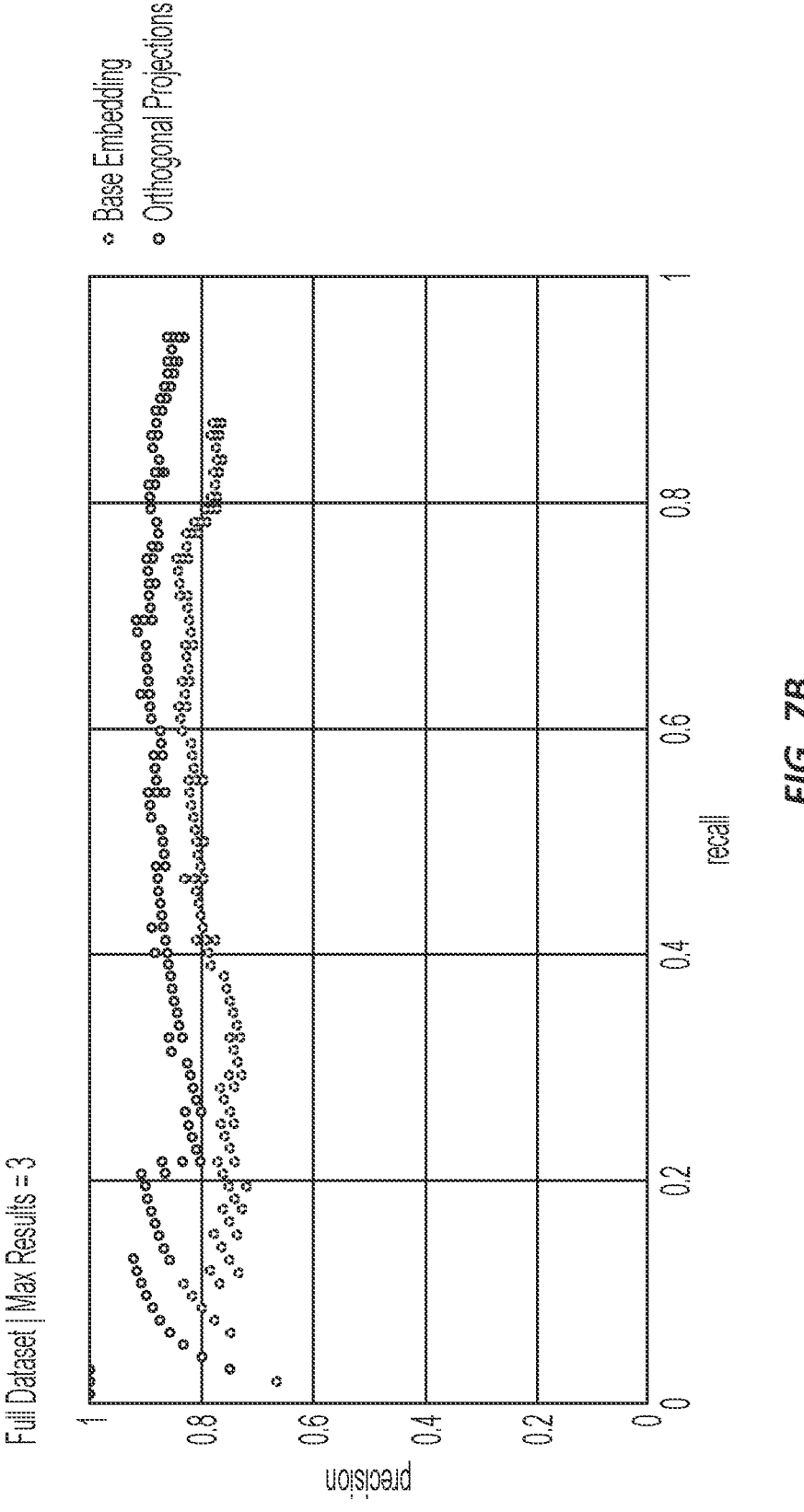
Figure 8A:
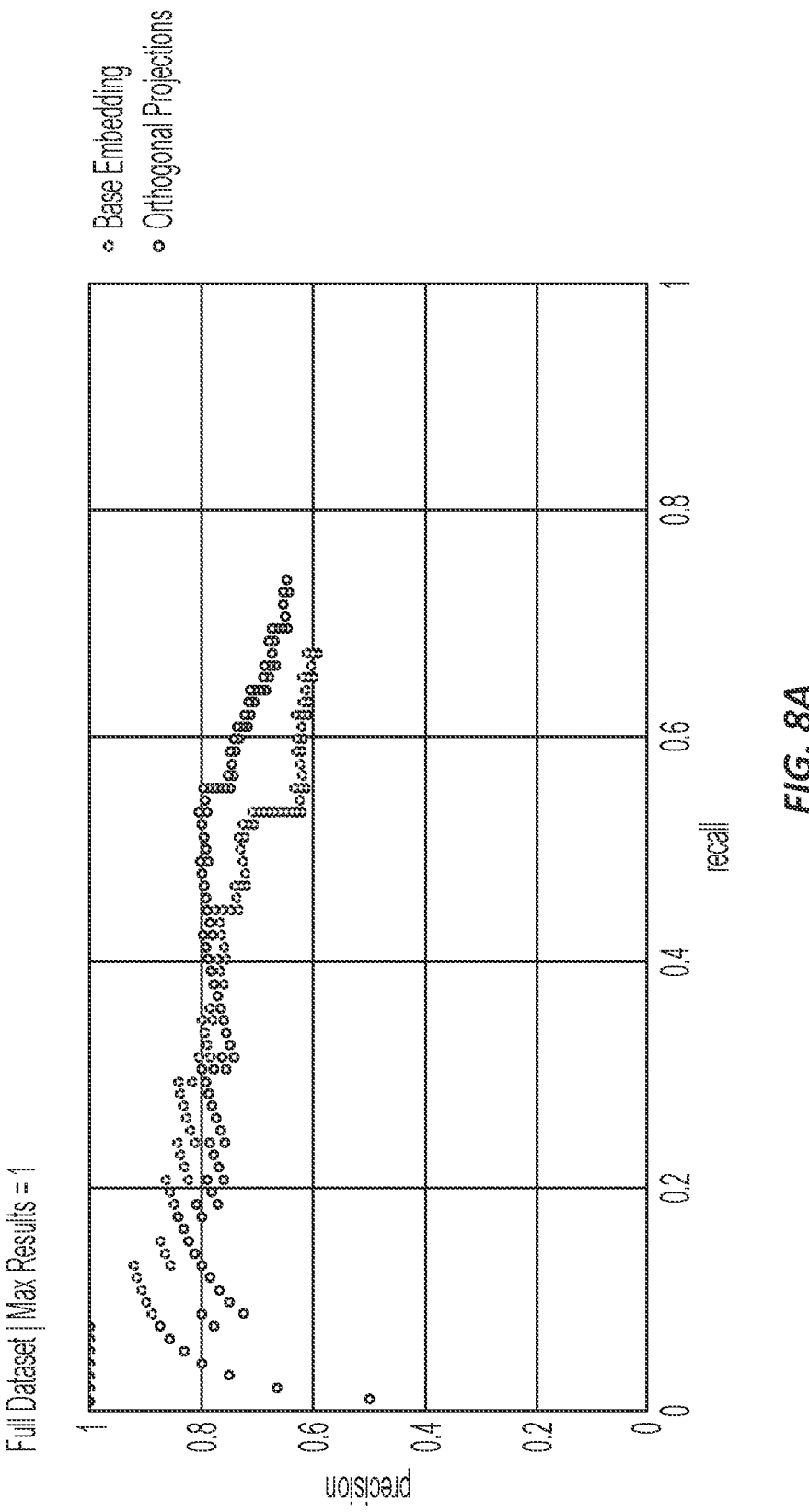
Figure 8B:
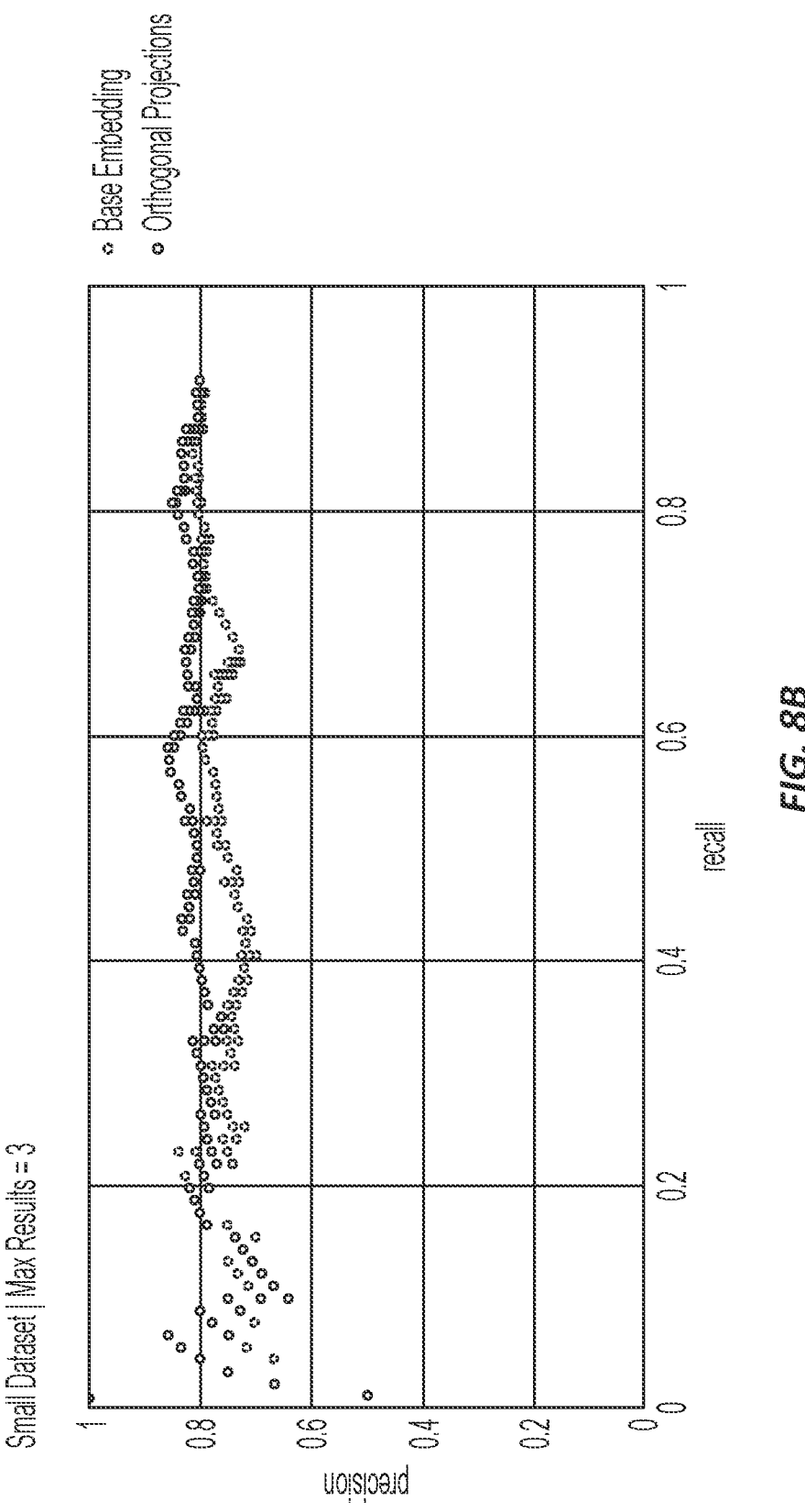

FIG. 4 is a simplified block diagram of a networked system suitable for implementing the intent classification framework described in FIGS. 2A-2B and other embodiments described herein. In one embodiment, block diagram 400 shows a system including the user device 410 which may be operated by user 440, data vendor servers 445, 470 and 480, server 430, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 410, data vendor servers 445, 470 and 480, and the server 430 may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message indicating an intent classification label, or a system response generated based on the intent classification label, from the server 430 and display the message via the UI application 412. In other embodiments, user device 410 may include additional or different modules having specialized hardware and/or software as required.

In various embodiments, user device 410 includes other applications 416 as may be desired in particular embodiments to provide features to user device 410. For example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a prediction result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view a system response.

User device 410 may further include database 418 stored in a transitory and/or non-transitory memory of user device 410, which may store various applications and data and be utilized during execution of various modules of user device 410. Database 418 may store user profile relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 419 adapted to communicate with data vendor server 445 and/or the server 430. In various embodiments, network interface component 419 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts one or more of the databases 403*a-n* (or collectively referred to as 403) to provide training datasets including a training corpus of utterance and intent pairs to the server 430. The database 403 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 403, via the network interface 426, to the server 430.

The server 430 may be housed with the intent classification module 330 and its submodules described in FIG. 1. In some implementations, module 330 may receive data from database 419 at the data vendor server 445 via the network 460 to generate an intent classification label. The generated intent classification label may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the intent classification model 330. In one implementation, the database 432 may store previously generated responses or intent classification labels, and the corresponding input feature vectors.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

Example Work Flows

FIG. 5 is an example logic flow diagram illustrating a method of intent classification training based on the framework shown in FIGS. 1-2B, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the intent classification module 330 (e.g., FIGS. 3-4) that trains a document recommendation model.

As illustrated, the method 500 includes a number of enumerated steps, but aspects of the method 500 may include additional steps before, after, and in between the enumerated steps. In some aspects, one or more of the enumerated steps may be omitted or performed in a different order.

At step 502, a training dataset of utterances annotated with intent labels (e.g., labeled data 202 in FIGS. 2A-2B) may be received, via a communication interface (e.g., 315 in FIG. 3), respectively. For example, the training dataset comprises utterances and/or intent labels in multiple languages.

At step 504, a pretrained language model (e.g., 220 in FIGS. 2A-2B) may encode a first set of utterances from the training dataset into a first set of embeddings in a feature space. For example, the pretrained language model is a multilingual language model.

At step 506, a testing utterance may be received via a communication interface.

At step 508, the pretrained language model may encode the testing utterance into a first embedding in the feature space.

At step 510, a first set of distances may be computed between the first embedding and the first set of embeddings, respectively. For example, each distance in the first set of distances is computed as a semantic similarity between the testing utterance and a training utterance corresponding to an embedding in the first set of embeddings.

At step 512, a weighted K-nearest neighbor classifier (e.g., 240 in FIGS. 2A-2B) may determine a first intent label for the testing utterance based on a set of nearest neighboring embeddings to the first embedding from the first set of embeddings. For example, the value of K is determined by a minimum number of utterances that belong to a same intent class in the first set of utterances.

At step 514, a question answering model may generate a response (e.g., 109 in FIG. 1) to the testing utterance at least in part based on the first intent label.

In one embodiment, the weighted K-nearest neighbor classifier may be trained in a similar manner as described in steps 508-512. Instead of a testing utterance, the pretrained language model may encode another training utterance (e.g., not part of the first set) into a second embedding in the feature space. A second set of distances may be computed between the second embedding and the first set of embeddings, respectively. The weighted K-nearest neighbor classifier may determine a second intent label for the training utterance, e.g., by searching for the nearest neighbors as described in step 512. A loss may be computed based on a difference between the second intent label and an annotated label associated with the training utterance. The weighted K-nearest neighbor classifier may then be updated based on the loss while keeping the pretrained language model frozen. In this way, the pretrained language model serves as a feature extractor that is ready to "plug-in" without further training, while only the classifier decoder may be further finetuned. Training efficiency can be largely improved.

FIG. 6 is an example logic flow diagram illustrating a method of intent classification training with OOD detection based on the framework shown in FIGS. 1-2B, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the intent classification module 330 (e.g., FIGS. 3-4) that trains a document recommendation model.

As illustrated, the method 600 includes a number of enumerated steps, but aspects of the method 600 may include additional steps before, after, and in between the enumerated steps. In some aspects, one or more of the enumerated steps may be omitted or performed in a different order.

Continuing on from step 510, at step 602, a respective set of distances may be computed, for each training utterance that belongs to a first intent class, between the each training utterance and other training utterances in all other intent classes, respectively.

At step 604, an inter-domain threshold may be determined according to a percentage of all computed distances, e.g., 5%, 10%, and/or the like.

At step 606, an OOD thresholding module (e.g., 230 in FIG. 2B) may determine whether the set of nearest neighboring embeddings are within a range of the inter-domain threshold to the first embedding.

At step 607, if it is determined that that no neighboring embedding is under the inter-domain threshold to the first embedding, method 600 proceeds to step 608, where the testing utterance is determined to be OOD. Otherwise, if there is neighboring embedding under the inter-domain threshold to the first embedding at step 607, method 600 proceeds to step 609.

At step 609, the set of nearest neighboring embeddings is filtered by removing neighboring embeddings that are out of the range of the inter-domain threshold.

At step 610, the weighted K-nearest neighbor classifier may determine the first intent label based on the filtered set of nearest neighboring embeddings, e.g., in a similar manner as step 512. Method 600 may then proceed to step 514 in FIG. 5.

Example Data Experiments

FIGS. 7A-8B provide example data plots illustrating data experiment performance, according to embodiments described herein. The intent classification model described in FIGS. 1-6 is tested on an example training dataset (e.g., 24 utterances per intent) and a smaller reduced dataset (e.g., 5 utterances per intent). An orthogonal projection model is trained, and then the projected vectors are used as a KNN classifier on the test data. Additional details relating to the orthogonal projection model is described in co-pending and commonly-owned U.S. nonprovisional application Ser. No. 17/836,591, filed Jun. 9, 2022, which is hereby expressly incorporated by reference herein in its entirety.

As shown in each of FIGS. 7A-7B and 8A-8B, a curve for Top 1 prediction (show the user up to 1 top intent), and Top 3 prediction (show the user up to 3 possible intents, if all are above threshold) is plotted. The projected data significantly outperforms base LaBSE embeddings in every scenario. Notably, even 5 utterances per intent is enough to train a generalizable orthogonal projection model.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of operating a cross-lingual intent classification framework in a conversation agent, the method comprising:

receiving, via a communication interface for the cross-lingual intent classification framework implemented on one or more processors, a training dataset of utterances annotated with intent labels corresponding to a plurality of pre-defined intent classes, respectively, wherein the cross-lingual intent classification framework comprises a dual encoder architecture of a pretrained multi-lingual language model and a weighted K-nearest neighbor classifier as a decoder;

encoding, via a shared embedding neural network in the dual encoder architecture of the pretrained multi-lingual language model, a first set of utterances from the training dataset into a first set of embeddings in a feature space;

receiving, via a communication interface, a testing utterance;

encoding separately, via the shared embedding neural network in the dual encoder architecture of the pretrained multi-lingual language model, the testing utterance into a first embedding in the feature space;

computing a first set of distances between the first embedding and the first set of embeddings, respectively;

determining a set of nearest neighboring embeddings from the first set of embeddings, which are nearest neighbors to the first embedding based on the first set of distances;

removing, from the set of nearest neighboring embeddings, one or more neighboring embeddings that are out of range from the first embedding based on at least one inter-domain threshold associated with the plurality of pre-defined intent classes;

decoding, via the weighted K-nearest neighbor classifier, a first intent label for the testing utterance based on remaining neighboring embeddings in the set of nearest neighboring embeddings; and generating, by a question answering model, a response to the testing utterance at least in part based on the first intent label.

2. The method of claim 1, wherein the pretrained language model is a multilingual language model, and wherein the training dataset comprises utterances and/or intent labels in multiple languages.

3. The method of claim 1, wherein each distance in the first set of distances is computed as a semantic similarity between the testing utterance and a training utterance corresponding to an embedding in the first set of embeddings.

4. The method of claim 1, further comprising:

encoding, via the pretrained language model, a training utterance into a second embedding in the feature space;

computing a second set of distances between the second embedding and the first set of embeddings, respectively;

determining, via the weighted K-nearest neighbor classifier, a second intent label for the training utterance;

computing a loss based on a difference between the second intent label and an annotated label associated with the training utterance; and updating the weighted K-nearest neighbor classifier based on the loss while keeping the pretrained language model frozen.

5. The method of claim 1, further comprising:

computing, for each training utterance that belongs to a first intent class, a respective set of distances between the each training utterance and other training utterances in all other intent classes, respectively;

determining the at least one inter-domain threshold according to a percentage of all computed distances;

determining whether the set of nearest neighboring embeddings are within a range of the at least one inter-domain threshold to the first embedding; and in response to determining that no neighboring embedding is under the inter-domain threshold to the first embedding, determining that the testing utterance is OOD.

6. The method of claim 1, wherein a value of K is determined by a minimum number of utterances that belong to a same intent class in the first set of utterances.

7. A system of operating a cross-lingual intent classification framework in a conversation agent, the system comprising:

a communication interface receiving a training dataset of utterances annotated with intent labels corresponding to a plurality of pre-defined intent classes, respectively, respectively and a testing utterance;

a memory storing the cross-lingual intent classification framework comprising a dual encoder architecture of a pretrained multi-lingual language model, a weighted K-nearest neighbor classifier as a decoder, and a plurality of processor-executable instructions; and one or more processors executing the plurality of processor-executable instructions to perform operations comprising:

encoding, via a shared embedding neural network in a dual encoder architecture of the pretrained multi-lingual language model, a first set of utterances from the training dataset into a first set of embeddings in a feature space;

receiving, via a communication interface, a testing utterance;

encoding separately, via the shared embedding neural network in the dual encoder architecture of the pretrained multi-lingual language model, the testing utterance into a first embedding in the feature space;

computing a first set of distances between the first embedding and the first set of embeddings, respectively;

determining a set of nearest neighboring embeddings from the first set of embeddings, which are nearest neighbors to the first embedding based on the first set of distances;

removing, from the set of nearest neighboring embeddings, one or more neighboring embeddings that are out of range from the first embedding based on at least one inter-domain threshold associated with the plurality of pre-defined intent classes;

decoding, via the weighted K-nearest neighbor classifier, a first intent label for the testing utterance based on remaining neighboring embeddings in the set of nearest neighboring embeddings; and generating, by a question answering model, a response to the testing utterance at least in part based on the first intent label.

8. The system of claim 7, wherein the pretrained language model is a multilingual language model, and wherein the training dataset comprises utterances and/or intent labels in multiple languages.

9. The system of claim 7, wherein each distance in the first set of distances is computed as a semantic similarity between the testing utterance and a training utterance corresponding to an embedding in the first set of embeddings.

10. The system of claim 7, wherein the operations further comprise:

encoding, via the pretrained language model, a training utterance into a second embedding in the feature space;

computing a second set of distances between the second embedding and the first set of embeddings, respectively;

determining, via the weighted K-nearest neighbor classifier, a second intent label for the training utterance;

computing a loss based on a difference between the second intent label and an annotated label associated with the training utterance; and updating the weighted K-nearest neighbor classifier based on the loss while keeping the pretrained language model frozen.

11. The system of claim 7, wherein the operations further comprise:

computing, for each training utterance that belongs to a first intent class, a respective set of distances between the each training utterance and other training utterances in all other intent classes, respectively;

determining the at least one inter-domain threshold according to a percentage of all computed distances;

determining whether the set of nearest neighboring embeddings are within a range of the at least one inter-domain threshold to the first embedding; and in response to determining that no neighboring embedding is under the inter-domain threshold to the first embedding, determining that the testing utterance is OOD.

12. The system of claim 7, wherein a value of K is determined by a minimum number of utterances that belong to a same intent class in the first set of utterances.

13. A non-transitory processor-readable storage medium storing processor-executable instructions for operating a cross-lingual intent classification framework in a conversation agent, the instructions being executed by one or more processors to perform operations comprising:

receiving, via a communication interface for the cross-lingual intent classification framework implemented on one or more processors, a training dataset of utterances annotated with intent labels corresponding to a plurality of pre-defined intent classes, respectively, wherein the cross-lingual intent classification framework comprises a dual encoder architecture of a pretrained multi-lingual language model and a weighted K-nearest neighbor classifier as a decoder;

encoding, via a shared embedding neural network in a dual encoder architecture of the pretrained multi-lingual language model, a first set of utterances from the training dataset into a first set of embeddings in a feature space;

receiving, via a communication interface, a testing utterance;

encoding separately, via the shared embedding neural network in the dual encoder architecture of the pretrained multi-lingual language model, the testing utterance into a first embedding in the feature space;

computing a first set of distances between the first embedding and the first set of embeddings, respectively;

determining a set of nearest neighboring embeddings from the first set of embeddings, which are nearest neighbors to the first embedding based on the first set of distances;

removing, from the set of nearest neighboring embeddings, one or more neighboring embeddings that are out of range from the first embedding based on at least one inter-domain threshold associated with the plurality of pre-defined intent classes;

decoding, via the weighted K-nearest neighbor classifier, a first intent label for the testing utterance based on remaining neighboring embeddings in the set of nearest neighboring embeddings; and generating, by a question answering model, a response to the testing utterance at least in part based on the first intent label.

14. The medium of claim 13, wherein the pretrained language model is a multilingual language model, and wherein the training dataset comprises utterances and/or intent labels in multiple languages.

15. The medium of claim 13, wherein each distance in the first set of distances is computed as a semantic similarity between the testing utterance and a training utterance corresponding to an embedding in the first set of embeddings.

16. The medium of claim 13, wherein the operations further comprise:

encoding, via the pretrained language model, a training utterance into a second embedding in the feature space;

computing a second set of distances between the second embedding and the first set of embeddings, respectively;

determining, via the weighted K-nearest neighbor classifier, a second intent label for the training utterance;

computing a loss based on a difference between the second intent label and an annotated label associated with the training utterance; and updating the weighted K-nearest neighbor classifier based on the loss while keeping the pretrained language model frozen.

17. The medium of claim 13, wherein the operations further comprise:

computing, for each training utterance that belongs to a first intent class, a respective set of distances between the each training utterance and other training utterances in all other intent classes, respectively;

determining the at least one inter-domain threshold according to a percentage of all computed distances;

determining whether the set of nearest neighboring embeddings are within a range of the at least one inter-domain threshold to the first embedding; and in response to determining that no neighboring embedding is under the inter-domain threshold to the first embedding, determining that the testing utterance is OOD.

* * * * *